US012632822B1

(12) United States Patent
R

(10) Patent No.: US 12,632,822 B1
(45) Date of Patent: May 19, 2026

(54) DYNAMIC SWITCHING IN HIERARCHICAL LPOPT SOLVE

(71) Applicant: Blue Yonder Group, Inc., Scottsdale, AZ (US)

(72) Inventor: Devanand R, Jharkhand (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 131 days.

(21) Appl. No.: 17/858,727

(22) Filed: Jul. 6, 2022

Related U.S. Application Data

(60) Provisional application No. 63/219,093, filed on Jul. 7, 2021.

(51) Int. Cl.
| | |
|---|---|
| *G06N 3/063* | (2023.01) |
| *G06N 3/04* | (2023.01) |
| *G06Q 10/04* | (2023.01) |
| *G06Q 10/087* | (2023.01) |

(52) U.S. Cl.
CPC ........... *G06Q 10/087* (2013.01); *G06Q 10/04* (2013.01)

(58) Field of Classification Search
CPC .............................. G06Q 10/087; G06Q 10/04
See application file for complete search history.

(56) References Cited

U.S. PATENT DOCUMENTS

| | | | | |
|---|---|---|---|---|
| 8,429,035 | B1 * | 4/2013 | Kamath | G06Q 10/06 |
| | | | | 705/28 |
| 8,756,165 | B1 * | 6/2014 | Haake | G06Q 10/0832 |
| | | | | 705/332 |

| | | | | |
|---|---|---|---|---|
| 10,482,421 | B1 * | 11/2019 | Ducrou | G06V 20/54 |
| 10,846,645 | B2 * | 11/2020 | Smith | G06Q 10/06312 |
| 10,943,289 | B2 * | 3/2021 | Mattingly | G06Q 30/0633 |
| 11,315,059 | B1 * | 4/2022 | R | G06F 16/90344 |
| 11,334,827 | B1 * | 5/2022 | R | G06V 10/752 |
| 11,461,866 | B1 * | 10/2022 | R | G06Q 10/06315 |
| 11,769,092 | B1 * | 9/2023 | Shankdhar | G06Q 10/06316 |
| | | | | 705/7.25 |
| 11,875,289 | B1 * | 1/2024 | Shinde | G06K 7/10722 |
| 11,900,546 | B1 * | 2/2024 | Christy | G06Q 10/06393 |
| 2002/0152128 | A1 * | 10/2002 | Walch | G06Q 30/0633 |
| | | | | 705/26.8 |

(Continued)

*Primary Examiner* — Talia F Crawley
(74) *Attorney, Agent, or Firm* — Spencer Fane LLP; Steven J. Laureanti

(57) ABSTRACT

A system and method are disclosed for dynamic switching in hierarchical LPOPT solving for supply chain entities. The system provides an architecture of a supply chain planner including a server including a user action processor, a visualization engine, a dynamic solver engine and a similarity comparison engine. The system architecture and method enables the solving of hierarchical supply chain problems with reduced computational requirements and in a shorter period of time. The method comprises solving, using the dynamic solver engine, a first hierarchical problem and a second hierarchical problem with advance basis information from the first hierarchical problem, comparing, using the similarity comparison engine, the first hierarchical problem to the second hierarchical problem; and when the first hierarchical problem is dissimilar to the second hierarchical problem, re-solving, using the dynamic solver engine, the second hierarchical problem without advance basis information from the first hierarchical problem.

20 Claims, 9 Drawing Sheets

(56)　　　　　　References Cited

U.S. PATENT DOCUMENTS

| | | | |
|---|---|---|---|
| 2005/0119919 A1* | 6/2005 | Eder ..................... | G06Q 40/00 |
| | | | 705/4 |
| 2005/0171827 A1* | 8/2005 | Denton ........... | G06Q 10/06312 |
| | | | 705/7.29 |
| 2008/0065436 A1* | 3/2008 | Wu ........................ | G06Q 20/20 |
| | | | 705/7.38 |
| 2013/0346614 A1* | 12/2013 | Baughman ........... | G06F 9/5083 |
| | | | 709/226 |
| 2015/0227890 A1* | 8/2015 | Bednarek .......... | G06Q 10/0833 |
| | | | 705/26.81 |
| 2015/0254603 A1* | 9/2015 | Bashkin ................ | G06V 40/70 |
| | | | 312/237 |
| 2017/0024804 A1* | 1/2017 | Tepfenhart, Jr. ... | G06Q 30/0635 |
| 2017/0039511 A1* | 2/2017 | Corona .................. | F25D 29/00 |
| 2017/0146287 A1* | 5/2017 | Rezayat .................. | F25D 13/00 |
| 2017/0178070 A1* | 6/2017 | Wang ............ | G06Q 10/063116 |
| 2017/0185928 A1* | 6/2017 | Zhou ................... | G06Q 10/047 |
| 2018/0130015 A1* | 5/2018 | Jones .................. | G06Q 10/083 |
| 2018/0260752 A1* | 9/2018 | Verma ................. | G06Q 10/083 |
| 2019/0026696 A1* | 1/2019 | Mattingly ........ | G06Q 10/08355 |
| 2019/0242716 A1* | 8/2019 | N ....................... | G01C 21/3469 |
| 2019/0333015 A1* | 10/2019 | Beasley ................ | G06Q 10/08 |
| 2020/0250737 A1* | 8/2020 | Wallace ............ | G06Q 30/0639 |
| 2020/0348077 A1* | 11/2020 | Lee ........................ | F25D 29/00 |
| 2021/0004760 A1* | 1/2021 | Durkee ........... | G06Q 10/06316 |
| 2021/0256443 A1* | 8/2021 | Srivastava .......... | G06Q 10/067 |
| 2021/0268313 A1* | 9/2021 | Gunnarsson ............ | G06T 7/246 |
| 2021/0365764 A1* | 11/2021 | Eyole .................... | G06N 3/063 |
| 2022/0261708 A1* | 8/2022 | R ........................... | G06Q 10/04 |
| 2022/0277247 A1* | 9/2022 | R ........................... | G06Q 10/04 |
| 2023/0267404 A1* | 8/2023 | Villalobos ............ | B65D 88/745 |
| | | | 705/332 |
| 2024/0062138 A1* | 2/2024 | Nelson .............. | G06Q 10/0833 |

* cited by examiner

300
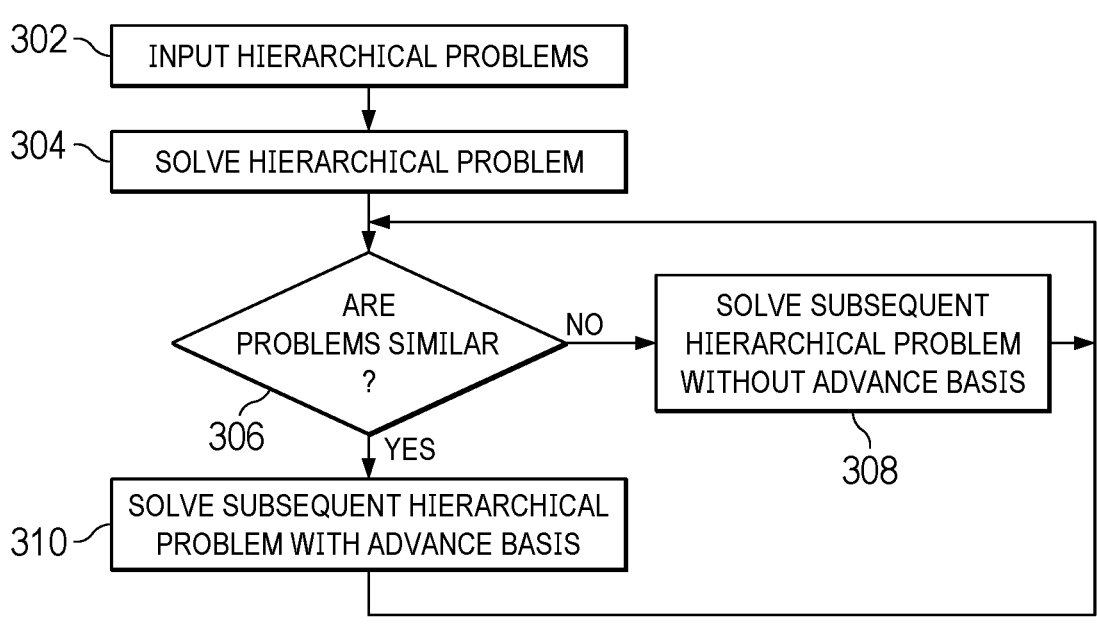
302 — INPUT HIERARCHICAL PROBLEMS
304 — SOLVE HIERARCHICAL PROBLEM
ARE
PROBLEMS SIMILAR
?
306
NO
SOLVE SUBSEQUENT
HIERARCHICAL PROBLEM
WITHOUT ADVANCE BASIS
308
YES
SOLVE SUBSEQUENT HIERARCHICAL
PROBLEM WITH ADVANCE BASIS
310
FIG. 3

400

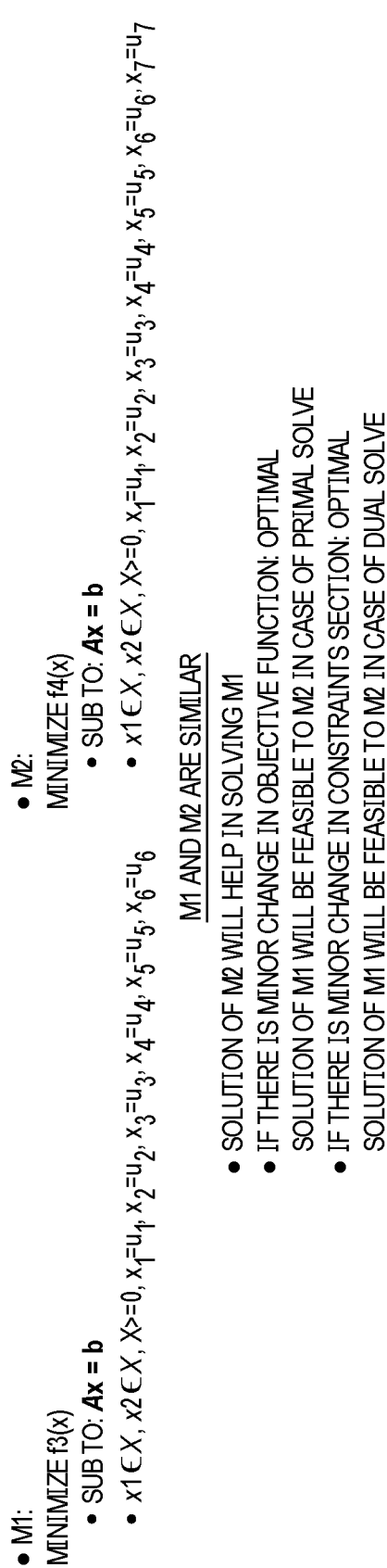

- M1:
  MINIMIZE f3(x)
  - SUB TO: Ax = b
  - x1 $\in$ X, x2 $\in$ X, X>=0, $x_1 = u_1$, $x_2 = u_2$, $x_3 = u_3$, $x_4 = u_4$, $x_5 = u_5$, $x_6 = u_6$

- M2:
  MINIMIZE f4(x)
  - SUB TO: Ax = b
  - x1 $\in$ X, x2 $\in$ X, X>=0, $x_1 = u_1$, $x_2 = u_2$, $x_3 = u_3$, $x_4 = u_4$, $x_5 = u_5$, $x_6 = u_6$, $x_7 = u_7$

<u>M1 AND M2 ARE SIMILAR</u>

- SOLUTION OF M2 WILL HELP IN SOLVING M1
- IF THERE IS MINOR CHANGE IN OBJECTIVE FUNCTION: OPTIMAL SOLUTION OF M1 WILL BE FEASIBLE TO M2 IN CASE OF PRIMAL SOLVE
- IF THERE IS MINOR CHANGE IN CONSTRAINTS SECTION: OPTIMAL SOLUTION OF M1 WILL BE FEASIBLE TO M2 IN CASE OF DUAL SOLVE

| | VerySimilar | Similar | Dissimilar |
|---|---|---|---|
| BOUND | percentageDev <= 1.0E-3 | percentageDev > 1.0E-3 AND percentageDev <= 15 | percentageDev > 15 |
| OBJ COEF | nonZUDev <= 100 | nonZUDev > 100 AND 100*nonZUDev/nonZeroPrev <= 10 | nonZUDev > 100 AND 100*nonZUDev/nonZeroPrev > 10 |
| NOTE: | BOLD NUMBERS ARE HARD CODED | | |
| | OBJ_THRSLD_PRCNT | 15% | |
| | NonZ_MAX_THRSLD_PRCNT | 10% | |
| | verySimbndFlag | 1.00E-03 | |
| | verySimCoefFlag | 100 | |

| CONDITION | BOUND | | | OBJ COEF | | | OUTPUT | | DECISION | |
|---|---|---|---|---|---|---|---|---|---|---|
| | DISSIMILAR | SIMILAR | VerySimilar | DISSIMILAR | SIMILAR | VerySimilar | SIMILAR | NotSimilar | ADV | METHOD |
| 1 | | | Y | | | Y | Y | | 1 | PRIMAL |
| 2 | | | Y | | Y | | Y | | 1 | PRIMAL |
| 3 | | Y | | | | Y | Y | | 1 | DUAL |
| 4 | | Y | | | Y | | Y | | 1 | PRIMAL |
| 5 | Y | | | | Y | | | Y | 0 | PRIMAL |
| 6 | Y | | | | | Y | Y | | 1 | DUAL |
| 7 | Y | | | Y | | | | Y | 0 | PRIMAL |
| 8 | | Y | | Y | | | | Y | 0 | PRIMAL |
| 9 | | | Y | Y | | | Y | | 1 | PRIMAL |

DYNAMIC SWITCHING IN HIERARCHICAL LPOPT SOLVE

CROSS REFERENCE TO RELATED APPLICATIONS

The present disclosure is related to that disclosed in the U.S. Provisional Application No. 63/219,093, filed Jul. 7, 2021, entitled "Dynamic Switching in Hierarchical LPOPT Solve." U.S. Provisional Application No. 63/219,093 is assigned to the assignee of the present application. The present invention hereby claims priority under 35 U.S.C. § 119(e) to U.S. Provisional Application No. 63/219,093.

TECHNICAL FIELD

The present disclosure relates generally to the solving of supply chain plan problems and specifically to solving supply chain plan problems using hierarchical linear programming.

BACKGROUND

Supply chain plans may specify actions and coordinate activities for various supply chain entities operating in a supply chain system, including but not limited to suppliers, manufacturers, distribution centers, and retailers. Supply chain plans may be generated as solutions to one or more supply chain problems, which specify, among other variables, available supply chain inputs, available supplies, desired outputs and/or finished goods, and/or applicable time periods. Supply chain plans may be generated on an hourly basis, daily basis, weekly basis, or any other time basis, and may direct purchasing, selling, manufacturing, shipping, and other actions for each supply chain entity in the supply chain system. Linear programming and optimization (LPOPT) techniques may enable supply chain entities to solve supply chain problems, generate supply chain plans in response to supply chain problems, and evaluate hypothetical what-if supply and demand scenarios. Some LPOPT systems may solve problems in a linear fashion using pre-solved information from a preceding or first problem. However, use of pre-solved information from previously problems may not be applicable to subsequent LPOPT problems as the advance basis may first appear, which may slow the solving process of LPOPT problems and may require the undesirable consumption of additional computation resources. This is turns leads to a slowdown of supply chain planning problems, slowing the entire supply chain pipeline from manufacturing to retailing, which is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 3 illustrates an exemplary supply chain hierarchical problem solving method, according to an embodiment;

FIG. 4 illustrates a similarity display generated by the visualization engine, according to an embodiment;

FIG. 8 illustrates an exemplary similarity threshold decision table, according to an embodiment; and FIG. 9 illustrates an exemplary output decision table, according to an embodiment.

DETAILED DESCRIPTION

Figure 1:
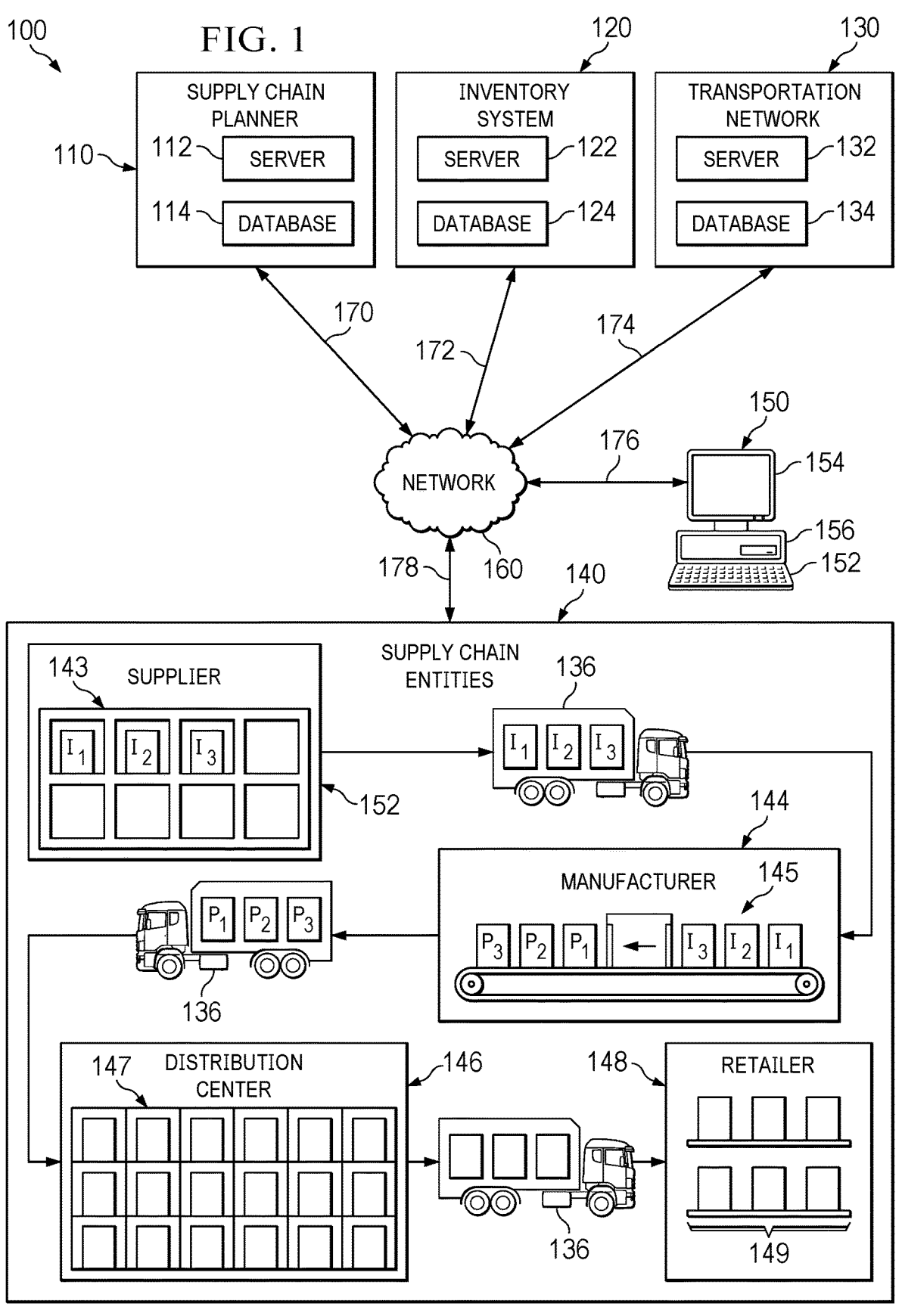
FIG. 1 illustrates an exemplary supply chain network according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide a supply chain planning system and method that utilizes a similarity-based dynamic switching approach to solve LPOPT problems by locating similar/dissimilar data within multi-objective hierarchical problems. Embodiments utilize a supply chain planner to access hierarchical problems, solve hierarchical problems, and compare the hierarchical problems to one another to determine one or more degrees of similarity. Where subsequent problems are sufficiently similar to previous hierarchical problems, embodiments use the advance basis information from previous hierarchical problems to solve subsequent hierarchical problems with reduced computational runtime requirements. Where subsequent problems are not sufficiently similar to previous hierarchical problems, embodiments dynamically switch to a solving process that does not require advance basis information.

Embodiments enable supply chain planners to dynamically decide when to use warm start and pre-solve LPOPT information to solve multi-objective hierarchical problems, and when to solve such multi-objective hierarchical problems without pre-solved or advance basis information. Embodiments improve the performance of hierarchical solves by leveraging pre-solved LPOPT data in circumstances in which the pre-solved data will enable the supply chain planner to solve subsequent hierarchical problems in a shorter period of time and with reduced computational requirements, and to dynamically switch to solving hierarchical problems without incorporating pre-solved data in circumstances in which the pre-solved data does not offer a computational advantage. Improved performance of hierarchical solves reduces the use of computing resources as well as improving the overall performance of the underlying supply chain.

FIG. 1 illustrates an exemplary supply chain network 100 according to a first embodiment. Supply chain network 100 comprises supply chain planner 110, inventory system 120, transportation network 130, one or more supply chain entities 140, computer 150, network 160, and communication links 170-178. Although a single supply chain planner 110, inventory system 120, transportation network 130, one or more supply chain entities 140, a single computer 150, and a single network 160 are shown and described, embodiments contemplate any number of supply chain planners 110, inventory systems 120, transportation networks 130, supply chain entities 140, computers 150, or networks 160, according to particular needs.

In one embodiment, supply chain planner 110 comprises server 112 and database 114. As explained in more detail below, server 112 comprises one or more modules to, for example, utilize dynamic switching in hierarchical problem solving by calculating, prior to solving a particular problem, whether a preceding problem is sufficiently similar to the particular problem to use the solution information from the preceding problem in solving the particular problem.

Inventory system 120 comprises server 122 and database 124. Server 122 of inventory system 120 is configured to receive and transmit inventory data, including item identifiers, pricing data, attribute data, inventory levels, and other like data about one or more items or products at one or more locations in supply chain network 100. Server 122 stores and retrieves inventory data from database 124 or from one or more locations in supply chain network 100.

According to embodiments, database 124 includes current or projected inventory quantities or states, order rules, or explanatory variables. For example, database 124 may comprise the current level of inventory for each item at one or more stocking points across supply chain network 100. In addition, database 124 may comprise order rules that describe one or more rules or limits on setting an inventory policy, including, but not limited to, a minimum order quantity, a maximum order quantity, a discount, and a step-size order quantity, and batch quantity rules. According to some embodiments, database 124 may comprise explanatory variables that describe the data relating to specific past, current, or future indicators and the data of promotions, seasonality, special events (such as sporting events), weather, and the like. According to some embodiments, supply chain planner 110 accesses and stores inventory data in database 124, which may be used by supply chain planner 110 to generate one or more supply chain plans. In addition, or as an alternative, the inventory data of database 124 may be updated by receiving current item quantities, mappings, or locations from inventory system 120, transportation network 130, and/or one or more supply chain entities 140.

Transportation network 130 comprises server 132 and database 134. According to embodiments, transportation network 130 directs one or more transportation vehicles 136 to ship one or more items between one or more supply chain entities 140, based, at least in part, on the supply chain plans and/or instruction sets generated by supply chain planner 110. Transportation vehicles 136 comprise, for example, any number of trucks, cars, vans, boats, airplanes, unmanned aerial vehicles (UAVs), cranes, robotic machinery, or the like. Transportation vehicles 136 may comprise radio, satellite, or other communication systems that communicates location information (such as, for example, geographic coordinates, distance from a location, global positioning satellite (GPS) information, or the like) with supply chain planner 110, inventory system 120, transportation network 130, and/or one or more supply chain entities 140 to identify the location of transportation vehicle 136 and the location of any inventory or shipment located on transportation vehicle 136. The number of items shipped by transportation vehicles 136 in transportation network 130 may also be based, at least in part, on the number of items currently in stock at one or more supply chain entities 140, the number of items currently in transit in transportation network 130, a forecasted demand, a supply chain disruption, and the like.

As shown in FIG. 1, supply chain network 100 operates on one or more computers 150 that are integral to or separate from the hardware and/or software that support supply chain planner 110, inventory system 120, transportation network 130, and one or more supply chain entities 140. Supply chain network 100 comprising supply chain planner 110, inventory system 120, transportation network 130, and one or more supply chain entities 140 may operate on one or more computers 150 that are integral to or separate from the hardware and/or software that support supply chain planner 110, inventory system 120, transportation network 130, and one or more supply chain entities 140. One or more computers 150 may include any suitable input device 152, such as a keypad, mouse, touch screen, microphone, or other device to input information. One or more computers 150 may also include any suitable output device 154, such as, for example, a computer monitor, that may convey information associated with the operation of supply chain network 100, including digital or analog data, visual information, or audio information. Computer 150 may include fixed or removable computer-readable storage media, including a non-transitory computer readable medium, magnetic computer disks, flash drives, CD-ROM, in-memory device or other suitable media to receive output from and provide input to supply chain network 100.

Computer 150 may include one or more processors 156 and associated memory to execute instructions and manipulate information according to the operation of supply chain network 100 and any of the methods described herein. One or more processors 156 may execute an operating system program stored in memory to control the overall operation of computer 150. For example, one or more processors 156 control the reception and transmission of signals within the system. One or more processors 156 execute other processes and programs resident in memory, such as, for example, registration, identification or communication and moves data into or out of the memory, as required by an executing process. In addition, or as an alternative, embodiments contemplate executing the instructions on computer 150 that cause computer 150 to perform functions of the method. Further examples may also include articles of manufacture including tangible computer-readable media that have computer-readable instructions encoded thereon, and the instructions may comprise instructions to perform functions of the methods described herein.

In addition, supply chain network 100 may comprise a cloud-based computing system having processing and storage devices at one or more locations, local to, or remote from supply chain planner 110, inventory system 120, transportation network 130, and one or more supply chain entities 140. In addition, each of one or more computers 150 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with supply chain planner 110, inventory system 120, transportation network 130, and one or more supply chain entities 140.

These one or more users may include, for example, a "manager" or a "planner" handling generation of supply chain plans and instruction sets, managing the inventory of items, imaging items, managing storage and shipment of items, and/or one or more related tasks within supply chain network 100. In addition, or as an alternative, these one or more users within supply chain network 100 may include, for example, one or more computers 150 programmed to autonomously handle, among other things, shelving resets, task management, communication and assignment of instructions, issue identification and resolution, controlling manufacturing equipment, and adjusting various levels of manufacturing and inventory levels at various stocking points and distribution centers 146, and/or one or more related tasks within supply chain network 100.

One or more supply chain entities 140 represent one or more supply chain networks 100, including one or more enterprises, such as, for example networks of one or more suppliers 142, manufacturers 144, distribution centers 146, retailers 148 (including brick and mortar and online stores), customers, and/or the like. Suppliers 142 may be any suitable entity that offers to sell or otherwise provides one or more items (i.e., materials, components, or products) to one or more manufacturers 144. Suppliers 142 may comprise automated distribution systems 143 that automatically transport products to one or more manufacturers 144 based, at least in part, on supply chain plans and/or instruction sets determined by supply chain planner 110 and/or one or more other factors described herein.

Manufacturers 144 may be any suitable entity that manufactures at least one product. Manufacturers 144 may use one or more items during the manufacturing process to produce any manufactured, fabricated, assembled, or otherwise processed item, material, component, good, or product. In one embodiment, a product represents an item ready to be supplied to, for example, one or more supply chain entities 140 in supply chain network 100, such as retailers 148, an item that needs further processing, or any other item. Manufacturers 144 may, for example, produce and sell a product to suppliers 142, other manufacturers 144, distribution centers 146, retailers 148, a customer, or any other suitable person or entity. Manufacturers 144 may comprise automated robotic production machinery 145 that produce products based, at least in part, on supply chain plans and/or instruction sets determined by supply chain planner 110 and/or one or more other factors described herein.

Distribution centers 146 may be any suitable entity that offers to store or otherwise distribute at least one product to one or more retailers 148 and/or customers. Distribution centers 146 may, for example, receive a product from a first one or more supply chain entities 140 in supply chain network 100 and store and transport the product for a second one or more supply chain entities 140. Distribution centers 146 may comprise automated warehousing systems 147 that automatically remove products from and place products into inventory based, at least in part, on one or more supply chain plans generated by supply chain planner 110.

Retailers 148 may be any suitable entity that obtains one or more products to sell to one or more customers. Retailers 148 may (like the other one or more supply chain entities 140) comprise a corporate structure having a retail headquarters and one or more retail stores. Retail headquarters comprises a central planning office with oversight of one or more retail stores. Retailer stores may comprise any online or brick-and-mortar store, including stores with shelving systems 149. The one or more retail stores may sell products according to rules, strategies, orders, and/or guidelines developed by one or more retail headquarters. For example, retail headquarters may create supply chain plans that determine how the store will shelve or display one or more products. Although supply chain plan execution may be performed in part by one or more retail employees, embodiments contemplate automated configuration of shelving and retail displays. This may include, for example, automated robotic shelving machinery that places products on shelves or automated shelving that automatically adjusts based, at least in part, on the supply chain plans. Shelving systems 149 may comprise, for example, various racks, fixtures, brackets, notches, grooves, slots, or other attachment devices for fixing shelves in various configurations. These configurations may comprise shelving with adjustable lengths, heights, and other arrangements.

Although one or more supply chain entities 140 are shown and described as separate and distinct entities, the same entity may simultaneously act as any one of one or more supply chain entities 140. For example, one or more supply chain entities 140 acting as a manufacturer can produce a product, and the same one or more supply chain entities 140 can act as a supplier to supply an item to itself or another one or more supply chain entities 140. Although one example of supply chain network 100 is shown and described in FIG. 1, embodiments contemplate any configuration of supply chain network 100, without departing from the scope described herein.

In one embodiment, each of supply chain planner 110, inventory system 120, transportation network 130, computer 150, and supply chain entities 140 may be coupled with network 160 using communication links 170-178, which may be any wireline, wireless, or other link suitable to support data communications between supply chain planner 110 and network 160 during operation of supply chain network 100. Although communication links 170-178 are shown as generally coupling supply chain planner 110, inventory system 120, transportation network 130, one or more supply chain entities 140, and computer 150 to network 160, any of supply chain planner 110, inventory system 120, transportation network 130, one or more supply chain entities 140, and computer 150 may communicate directly with each other, according to particular needs.

In another embodiment, network 160 includes the Internet and any appropriate local area networks (LANs), metropolitan area networks (MANs), or wide area networks (WANs) coupling supply chain planner 110, inventory system 120, transportation network 130, one or more supply chain entities 140, and computer 150. For example, data may be maintained locally to, or externally of supply chain planner 110, inventory system 120, transportation network 130, one or more supply chain entities 140, and computer 150 and made available to one or more associated users of supply chain planner 110, inventory system 120, transportation network 130, one or more supply chain entities 140, and computer 150 using network 160 or in any other appropriate manner. For example, data may be maintained in a cloud database at one or more locations external to supply chain planner 110, inventory system 120, transportation network 130, one or more supply chain entities 140, and computer 150 and made available to one or more associated users of supply chain planner 110, inventory system 120, transportation network 130, one or more supply chain entities 140, and computer 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

In accordance with the principles of embodiments described herein, supply chain planner 110 may generate supply chain plans and/or instruction sets for the inventory of one or more supply chain entities 140 in supply chain network 100. Furthermore, supply chain planner 110, inventory system 120, and/or transportation network 130 may instruct automated machinery (i.e., robotic warehouse systems, robotic inventory systems, automated guided vehicles, mobile racking units, automated robotic production machinery 145, robotic devices and the like) to adjust product mix ratios, inventory levels at various stocking points, production of products of manufacturing equipment, proportional or alternative sourcing of one or more supply chain entities 140, the configuration and quantity of packaging and shipping of products, and the display of products at one or more retail locations based on one or more supply chain plans and instruction sets, generated plans and policies and/or current inventory or production levels. When the inventory of an item falls to a reorder point, supply chain planner 110 may then automatically adjust product mix ratios, inventory levels, production of products of manufacturing equipment, and proportional or alternative sourcing of one or more supply chain entities 140 until the inventory is resupplied to a target quantity.

For example, the methods described herein may include computers 150 receiving product data from automated machinery having at least one sensor and the product data corresponding to an item detected by the sensor of the automated machinery. The received product data may include an image of the item, an identifier, as described above, and/or other product data associated with the item (dimensions, texture, estimated weight, and any other like data). The method may further include computers 150 looking up the received product data in database system associated with supply chain planner 110, inventory system 120, and/or transportation network 130 to identify the item corresponding to the product data received from the automated machinery.

Computers 150 may also receive, from the automated machinery, a current location of the identified item. Based on the identification of the item, computers 150 may also identify (or alternatively generate) a first mapping in database system, where the first mapping is associated with the current location of the item. Computers 150 may also identify a second mapping in database system, where the second mapping is associated with a past location of the identified item. Computers 150 may also compare the first mapping and the second mapping to determine if the current location of the identified item in the first mapping is different than the past location of the identified item in the second mapping. Computers 150 may then send instructions to the automated machinery based, as least in part, on one or more differences between the first mapping and the second mapping such as, for example, to locate an item to add to or remove from a shelf or an inventory of or shipment for one or more supply chain entities 140. In addition, or as an alternative, supply chain planner 110 monitors the supply chain constraints of one or more items at one or more supply chain entities 140 and adjusts the orders and/or inventory of one or more supply chain entities 140 based on the supply chain constraints.

Figure 2:
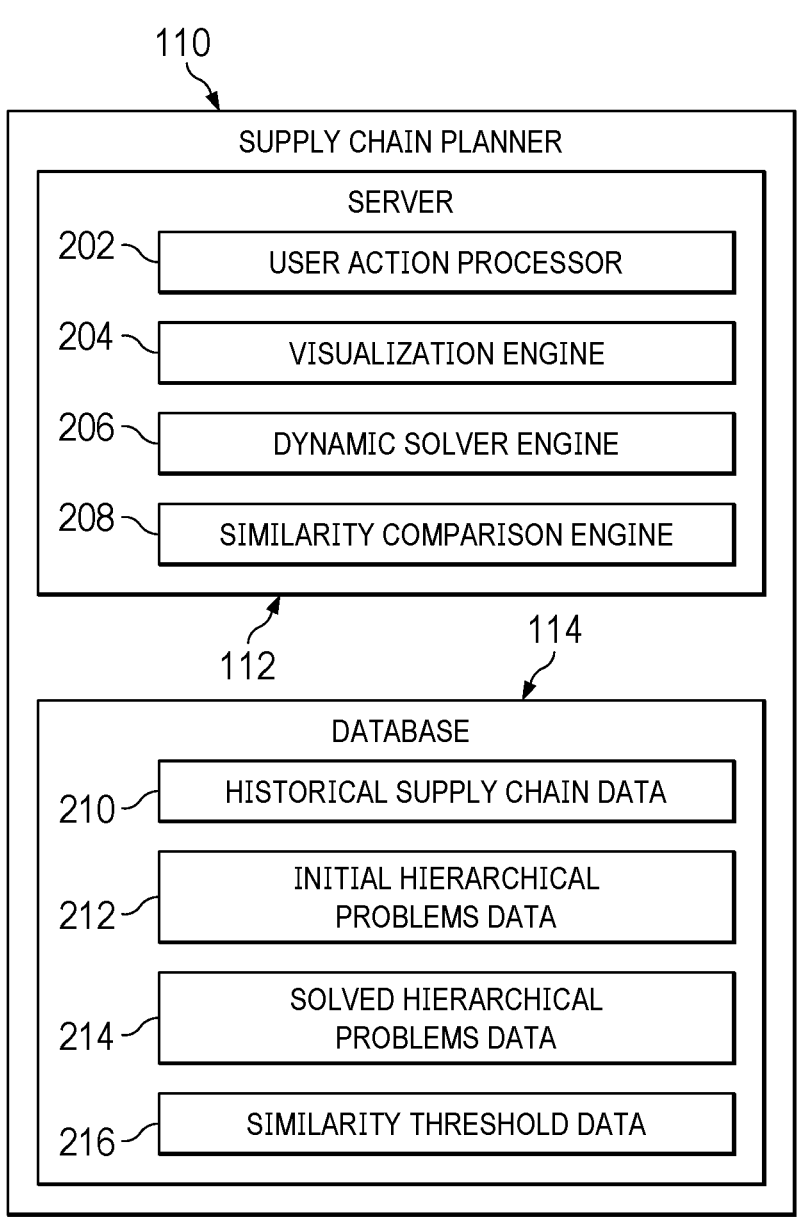
FIG. 2 illustrates the supply chain planner of FIG. 1 in greater detail in accordance with an embodiment.

FIG. 2 illustrates supply chain planner 110 of FIG. 1 in greater detail in accordance with an embodiment. As discussed above, supply chain planner 110 may comprise one or more computers 150 at one or more locations including associated input devices 152, output devices 154, non-transitory computer-readable storage media, processors 156, memory, or other components for receiving, processing, storing, and communicating information according to the operation of supply chain network 100. Additionally, supply chain planner 110 comprises server 112 and database 114. Although supply chain planner 110 is shown as comprising a single server 112 and a single database 114, embodiments contemplate any suitable number of computers 150, servers 112, or databases 114 internal to or externally coupled with supply chain planner 110. According to some embodiments, supply chain planner 110 may be located internal to one or more retailers 148 of one or more supply chain entities 140. In other embodiments, supply chain planner 110 may be located external to one or more retailers 148 of one or more supply chain entities 140 and may be located in for example, a corporate retailer of the one or more retailers 148, according to particular needs.

Server 112 of supply chain planner 110 may comprise user action processor 202, visualization engine 204, dynamic solver engine 206, and similarity comparison engine 208. Although server 112 is illustrated and described as comprising a single user action processor 202, visualization engine 204, dynamic solver engine 206, and similarity comparison engine 208, embodiments contemplate any suitable number or combination of these located at one or more locations, local to, or remote from supply chain planner 110, such as on multiple servers 112 or computers 150 at any location in supply chain network 100.

According to embodiments, user action processor 202 receives and processes a user input, such as, for example, input received by input device 152 of one or more computers 150. One or more computers 150 may transmit input to supply chain planner 110 using one or more communication links 170-178. User action processor 202 may register the input from one or more computers 150 and transmit the input to visualization engine 204, dynamic solver engine 206, and/or similarity comparison engine 208.

Visualization engine 204 generates one or more graphical user interface displays. According to embodiments, visualization engine 204 may access database 114, including but not limited to historical supply chain data 210, initial hierarchical problems data 212, solved hierarchical problems data 214, and/or similarity threshold data 216, and may generate one or more graphical user interface displays. The one or more graphical user interface displays may convey information, including LPOPT data, solved problems data, supply chain plan data, sales data, buffers data, supply chain entity data, and/or any other type of information about supply chain network 100 and LPOPT problems associated with supply chain network 100. In an embodiment, visualization engine 204 may process input transmitted by user action processor 202, and, in response to the input, may generate one or more graphical user input displays that allow one or more computers 150 to interact with the one or more graphical user interface displays and to review different information displayed by visualization engine 204, as illustrated in greater detail below.

Dynamic solver engine 206 may access and solve one or more hierarchical problems, as described in greater detail below. In certain cases, such as when two problems are highly similar, dynamic solver engine 206 may attain better solution performance by using solution data from a solved hierarchical problem to solve a subsequent hierarchical problem. In other cases, when the two problems are not similar, the use of existing solution data may be detrimental to solving an unsolved hierarchical problem. In such a case, dynamic solver engine 206 may start the solution anew to avoid the detriments associated with using solution data from a dissimilar hierarchical problem.

Similarity comparison engine 208 may compare two or more hierarchical problems to one another to determine whether the hierarchical problems are similar, according to one or more thresholds and definitions stored in similarity threshold data 216.

Database 114 of supply chain planner 110 may comprise one or more databases or other data storage arrangements at one or more locations, local to, or remote from, server 112. Database 114 may comprise, for example, historical supply chain data 210, initial hierarchical problems data 212, solved hierarchical problems data 214, and similarity threshold data 216. Although database 114 is shown and described as comprising historical supply chain data 210, initial hierarchical problems data 212, solved hierarchical problems data 214, and similarity threshold data 216, embodiments contemplate any suitable number or combination of these, located at one or more locations, local to, or remote from, supply chain planner 110 according to particular needs.

Historical supply chain data 210 comprises may comprise, for example, any data relating to the supply chain system. Historical supply chain data 210 may comprise data relating to supply chain entities 140, previous supply chain plans, transactions and shipments between supply chain entities 140, or past sales, past demand, purchase data, promotions, events, or the like of one or more products and/or one or more supply chain entities 140. Historical data may be stored at time intervals such as, for example, by the minute, hour, daily, weekly, monthly, quarterly, yearly, or any suitable time interval, including substantially in real time.

Initial hierarchical problems data 212 may comprise data related to one or more hierarchical problems in a pre-solved state, that is, before supply chain planner 110 has solved the one or more hierarchical problems.

Solved hierarchical problems data 214 may comprise data related to one or more solved hierarchical problems. Solved hierarchical problems data 214 may, in certain cases, be used as a warm start or initialization input for an unsolved hierarchical problem, such as a problem sorted in initial hierarchical problems data 212.

Similarity threshold data 216 may store one or more threshold values 706, definitions of similarity, and/or other similarity data, according to particular needs. Similarity threshold data 216 may be used by similarly comparison engine 208 in order to determine the similarity between a solved hierarchical problem (such as one stored in solved hierarchical problems data 214) and an unsolved hierarchical problem (such as one stored in initial hierarchical problems data 214) in order to determine if the solution data from the solved hierarchical problem may be used to initialize the solution to the unsolved hierarchical problem.

FIG. 3 illustrates an exemplary supply chain hierarchical problem solving method 300, according to an embodiment. The following method 300 proceeds by one or more activities, which although described in a particular order may be performed in one or more permutations, combinations, orders, or repetitions, according to particular needs.

At activity 302, dynamic solver engine 206 inputs one or more hierarchical problems, stored in historical supply chain data 210, into initial hierarchical problems data 212. In an embodiment, the hierarchical problems may comprise one or more objective functions and one or more given supply chain constraints. The hierarchical problems may comprise sequential names, identifications, and/or other data (such as, for example, "M1", "M2", "M3", and so on) that indicate the order in which dynamic solver engine 206 will solve the hierarchical problems during other activities of method 300.

At activity 304, dynamic solver engine 206 solves the first hierarchical problem. Dynamic solver engine 206 performs variable fixing associated with the first hierarchical problem. Having solved the first hierarchical problem and performed variable fixing, dynamic solver engine 206 stores data related to the solved first hierarchical problem and the fixed variables in solved hierarchical problems data 214.

At activity 306, similarity comparison engine 208 compares the first hierarchical problem (including data associated with the solving of the first hierarchical problem and the fixed variables associated with the first hierarchical problem) to the subsequent hierarchical problem (including data associated with the solving of the subsequent hierarchical problem and the fixed variables associated with the subsequent hierarchical problem) to determine whether the first hierarchical problem and the subsequent hierarchical problem are similar. In an embodiment, similarity comparison engine 208 may access one or more threshold values 706, stored in similarity threshold data 216, and may use the one or more threshold values 706 to determine the threshold of similarity between the first and subsequent hierarchical problems (i.e. whether the first and subsequent hierarchical problems are or are not similar to one another). In an embodiment, the one or more threshold values 706 may specify different degrees of similarity, including but not limited to "dissimilar," "similar," and "very similar," by which similarity comparison engine 208 may quantity similarity. According to embodiments, similarity comparison engine 208 may use one or more definitions of similarity, which may be stored in similarity threshold data 216, in combination with the one or more threshold values 706 to determine whether the first hierarchical problem is similar to the subsequent hierarchical problem.

By way of example only and not by way of limitation, in an embodiment, a first definition of similarity, stored in similarity threshold data 216, may be as follows: suppose $fx_1$ and $fx_2$ are numbers of fixed variables in linear programming (LP) problems $P_1$ and $P_2$ respectively. $P_1$ and $P_2$ are similar if their objective functions are similar and $(fx_2-fx_1)/fx_2 <= Thr$ (threshold value 706), where $Thr>0$. $(fx_2-fx_1)/fx_2$ may be referred to as 'LP deviation' of $P_2$ from $P_1$. Assuming hierarchical optimization, problem $P_1$ precedes $P_2$. $(fx_2-fx_1)/fx_2$ will always be positive. According to embodiments, the denominator is set to $fx_2$ as $fx_2$ will always be positive in case of hierarchical optimization. In an embodiment, $fx_1$ may be zero for first problem of hierarchical group.

By way of further example only and not by way of limitation, in an embodiment, a second definition of similarity may be as follows: Suppose $c_1$ and $c_2$ are objective function coefficient vectors in LP problems $P_1$ and $P_2$ respectively. Let number of nonzero elements in $c_1$, $c_2$ and $c_1-c_2$ be d1, d2 and d3 respectively. Objective functions of $P_1$ and $P_2$ are similar if $d3/max(d1,d2)<Thr1$, where $Thr1>=0$.

If, at activity 306, similarity comparison engine 208 determines that the first hierarchical problem and the subsequent hierarchical problem are not similar, supply chain planner 110 proceeds to activity 308. At activity 308, dynamic solver engine 206 solves the subsequent hierarchical problem without using the advance basis information from the solved first hierarchical problem, and stores the solution to the solved hierarchical problem without using advance basis information in solved hierarchical problems data 214. Supply chain planner 110 returns to activity 306, and similarity comparison engine 208 compares if the subsequent problem (now solved) and a next problem are similar.

If, at activity 306, similarity comparison engine 208 determines that the first hierarchical problem and the subsequent hierarchical problem are similar according to one or more threshold values 706, supply chain planner 110 proceeds to activity 310 and uses the data associated with the solving of the first and subsequent hierarchical problems (including fixed variables) as advance basis information to solve the next subsequent hierarchical problem, storing the solution to the next subsequent hierarchical problem in solved hierarchical problems data 214. The dynamic solver solves the subsequent hierarchical problem using the advance basis data and performs variable fixing, using the first hierarchical problem and variable fixing data as presolve data, to decrease the computational runtime required to complete the subsequent hierarchical problem. Having solved the subsequent hierarchical problem and performed variable fixing, dynamic solver engine 206 stores data related to the solved subsequent hierarchical problem and the fixed variables in solved hierarchical problems data 214. Supply chain planner 110 then returns to activity 306 and compares the solved subsequent hierarchical problem to the preceding hierarchical problem to determine similarity, as described above, and continues executing the activities of method 300 until no further hierarchical problems remain to be solved.

To illustrate the operation of supply chain planner 110 executing the activities of method 300, an example is now given. In the following example, supply chain planner 110 uses method 300 described above to solve three hierarchical problems (in this example, "M1" as the first problem, "M2" as the second problem, and "M3" as the third problem) and determines whether to dynamically switch between using and not using advance basis data from previous hierarchical problems to assist in solving subsequent hierarchical problems. Although a particular example of method 300 is provided herein, embodiments contemplate supply chain planner 110 implementing the activities of method 300 in any order and with respect to any number of hierarchical problems, according to particular needs.

Supply chain planner 110 uses method 300 to solve a hierarchical problem and determine whether to dynamically switch between using and not using first, advance basis information and second, an LP solving method, which are two important LP flags. Supply chain planner 110 does so using the concept of similarity. A similarity score used in deciding whether to switch the flags is computed using a previously solved LP problem and the current LP problem being solved. The information mainly used in similarity computation is the number of variables fixed (either at lower or upper bound) in the bounds section in LP formulation and the number of non-zero elements in the objective function vectors between the LP problems.

In this example, at activity 302, dynamic solver engine 206 inputs the three hierarchical problems (M1, M2, and M3), stored in historical supply chain data 210, into initial hierarchical problems data 212. Each of the M1, M2, and M3 hierarchical problems comprises one or more objective functions and one or more given supply chain constraints. At activity 304, dynamic solver engine 206 solves the first hierarchical problem (M1). Dynamic solver engine 206 performs variable fixing associated with M1. Having solved M1 and performed variable fixing, dynamic solver engine 206 stores data related to the solved M1 problem and the fixed variables in solved hierarchical problems data 214.

Continuing with this example and at activity 306, similarity comparison engine 208 compares M1 (including data associated with the solving of M1 and the fixed variables associated with M1) to M2 to determine whether M1 and M2 are similar. In addition, or as an alternative and continuing with this example, similarity comparison engine 208 accesses threshold value 706, stored in similarity threshold data 216, and uses the threshold value 706 to determine the threshold of similarity between M1 and M2. In this example, similarity comparison engine 208 determines that M1 and M2 are similar.

As a result, at activity 310, dynamic solver engine 206 solves M2 with the advance basis information from the solved M1 problem. The dynamic solver accesses M2, stored in initial hierarchical problems data 212, as well as the solved M1 problem and variable fixing data stored in solved hierarchical problems data 214, which may be used as advance basis data to solve M2. The dynamic solver solves M2 using the advance basis data from M1 and performs variable fixing, using the solved M1 problem and variable fixing data as pre-solve data, to decrease the computational runtime required to solve M2. Having solved M2 and performed variable fixing, dynamic solver engine 206 stores data related to the solved M2 problem and the fixed variables in solved hierarchical problems data 214. Visualization engine 204 then generates similarity display 400, illustrated by FIG. 4, displaying the conclusion that M1 and M2 are similar.

FIG. 4 illustrates similarity display 400 generated by visualization engine 204, according to an embodiment. Continuing the example, the visualization generates similarity display 400 to display information related to the finding of similarity between M1 and M2. Although FIG. 4 illustrates similarity display 400 in a particular configuration, embodiments contemplate visualization engine 204 generating similarity displays 400 in any configuration, and displaying any data stored in supply chain planner 110 database 114, according to particular needs.

Continuing the example, supply chain planner 110 then returns to third action 306 and compares the next M3 problem to the preceding solved M2 problem to determine similarity, as described above. In this example, similarity comparison engine 208 determines that M2 and M3 are not similar, and supply chain planner 110 proceeds to fourth activity 308.

Concluding the example, at fourth activity 308, dynamic solver engine 206 solves M3 without using the advance basis information from M2 and M1, and stores the solution to the solved M3 problem without using advance basis information in solved hierarchical problems data 214. Supply chain planner 110 determines that there are no further hierarchical problems remaining to be solved, and terminates method 300.

Figure 5:
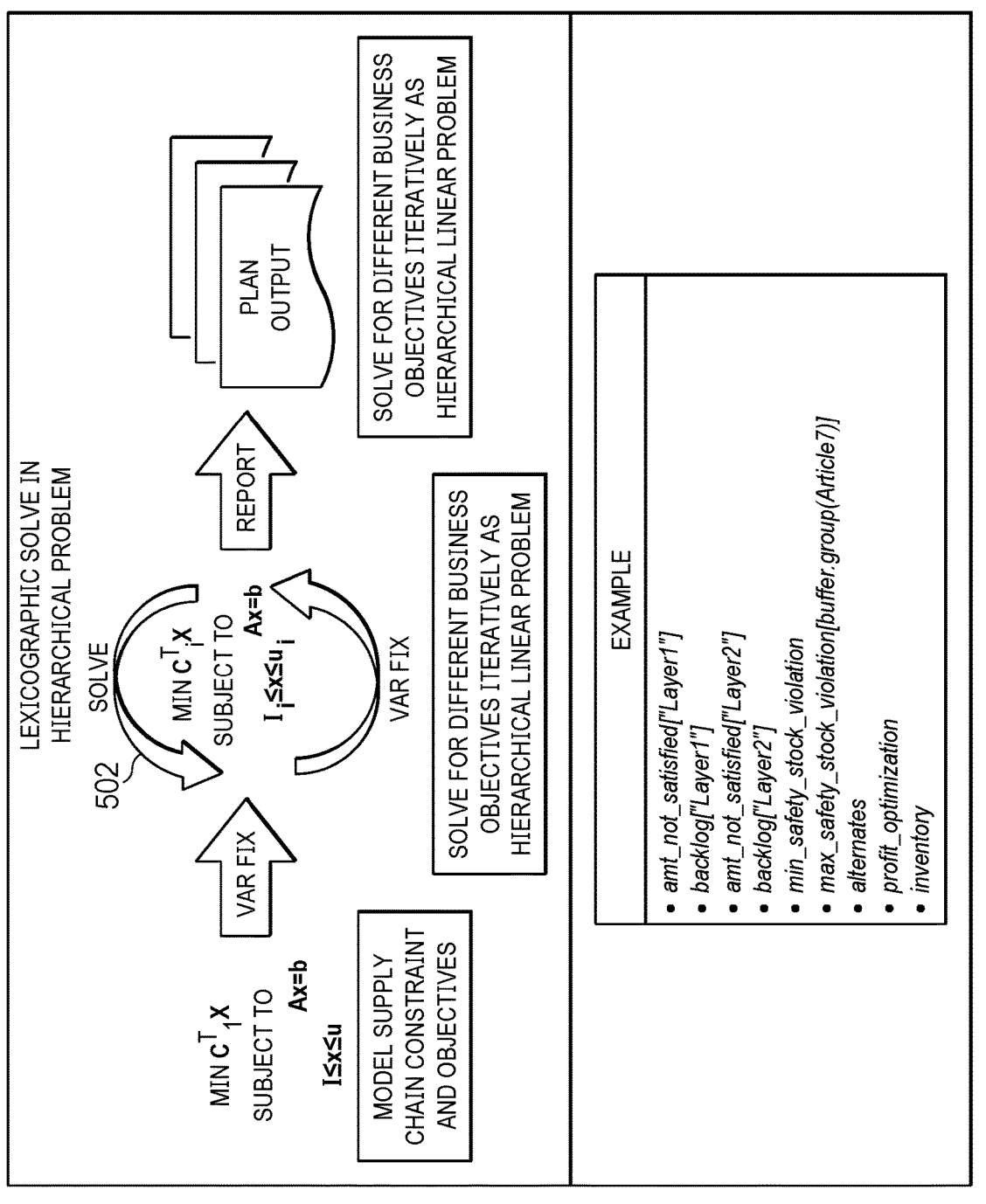
FIG. 5 illustrates an LPOPT solving method that does not enable dynamic switching, according to an embodiment.

FIG. 5 illustrates LPOPT solving method 500 that does not enable dynamic switching, according to an embodiment. In an embodiment, LPOPT solving method 500 illustrated by FIG. 5 may solve hierarchical problems in a step-by-step one-by-one fashion (lexicographic solve 502), using advance basis information throughout the solving method, and with pre-solve enabled only while solving the first hierarchical problem in the problem order (disabling pre-solve for subsequent hierarchical problems). LPOPT solving method 500 illustrated by FIG. 5 does not enable dynamic switching between using and not using advance basis information while solving subsequent hierarchical problems, and may result in advance basis information being used to solve a subsequent hierarchical problem that is not similar to the preceding problems, which may be inefficient and inaccurate as compared to method 300 described above in association with FIG. 3.

FIG. 5 illustrates an example situation where a priority business objective, amt_not_satisfied["Layer1"], is selected to solve first. A variable fixing logic is called that performs fixing of non-basic variables either at their lower or upper bound. If the non-basic variable has negative reduced cost, it will be fixed at the upper bound. If the non-basis variables have positive reduced cost, it will be fixed at their lower bound. Once such changes are made in the bound section, a next business objective, in this case backlog ["Layer1"], is solved and the similar logic of variable fixing is invoked. The procedure shown in this example may be called the "Lexicographic method".

Figure 6:
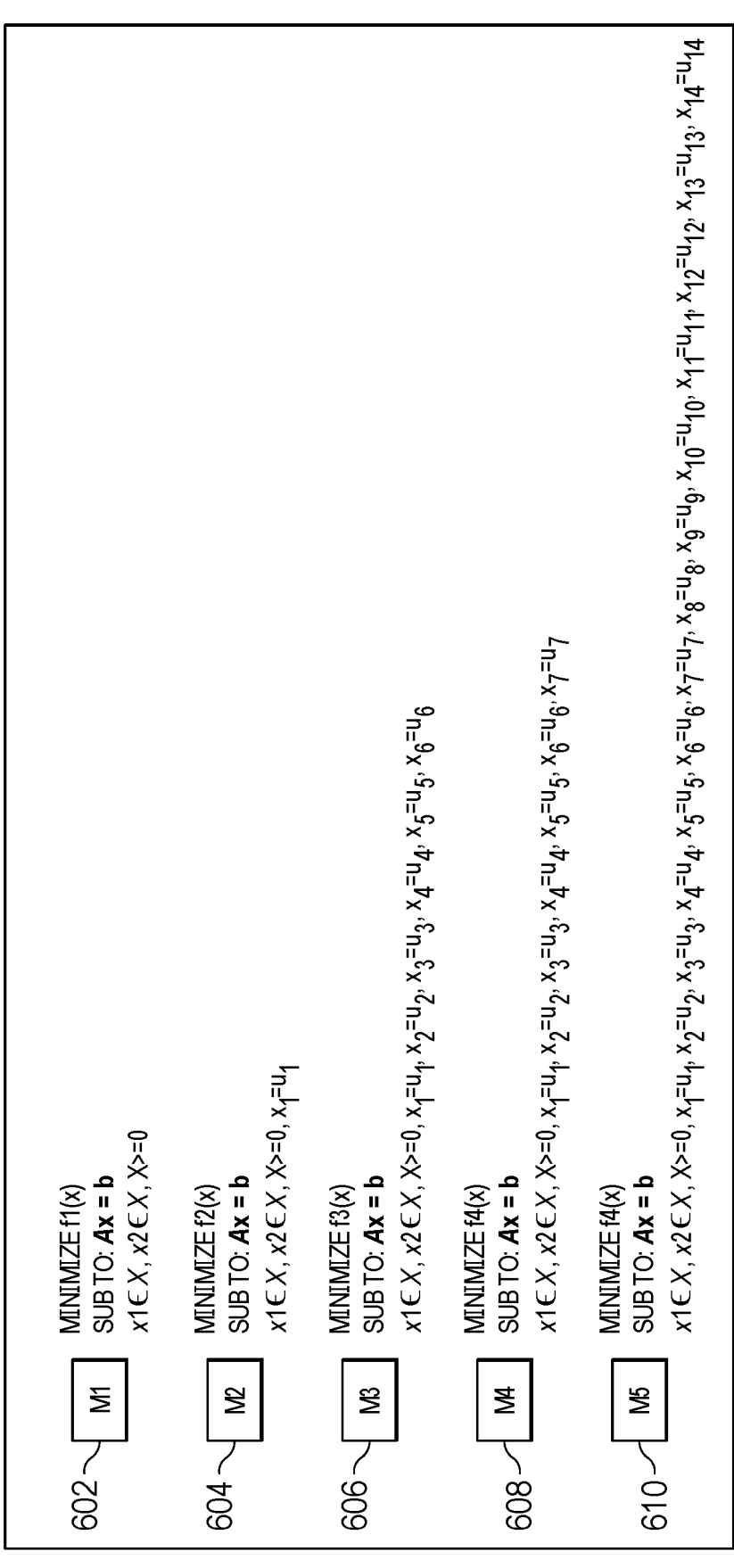
FIG. 6 illustrates five exemplary hierarchical problems (M1, M2, M3, M4, and M5), according to an embodiment.

FIG. 6 illustrates five exemplary hierarchical problems 602-610 (first problem 602 (M1), second problem 604 (M2), third problem 606 (M3), fourth problem 608 (M4), and fifth problem 610 (M5)), according to an embodiment. In the embodiment illustrated by FIG. 6, M5 is not structurally similar to M1-M4, and will not benefit from being solved using advance basis information from previous M1-M4 problems. Although FIG. 6 illustrates exemplary hierarchical problems 602-610 in a particular configuration, embodiments contemplate supply chain planner 110 solving hierarchical problems in any configuration and using any method, according to particular needs.

An LP solver, is invoked to solve the first problem, M1. After solving M1, the solution information is used to perform variable fixing. The variable fixing procedure, where some of the variables are fixed at their lower or upper bound using the reduced costs information is discussed above. Assume, number of variables fixed is f1. After variable fixing, supply chain planner 110 can again invoke the LP solver to solve problem M2. M2 is an LP problem which is same as M1 except for a different bound section (modified after variable fixing) and a different objective function vector (the next heist priority business objective). After M2 is solved, supply chain planner 110 performs the same procedure of variable fixing. The number of variables now fixed is f2. So now the decision of similarity and dissimilarity is done by (f2−f1)/f1. Threshold value 706 is a hard coded value. Supply chain planner 110 performs an exhaustive run of the similar fashion to compute this value, which will be customer specific. The range of threshold value 706 is based on the expert opinion of a user of supply chain planner 110.

Supply chain planner 110 may compute threshold value 706 (see FIG. 7) for use in determining the similarity between hierarchical problems. In one embodiment, it is assumed there is no major change in the supply chain flow rate. Supply chain planner 110 determines threshold value 706 by performing method 300 using hierarchal problems from a particular dataset with different threshold values and selecting threshold value 706 that gives the best performance, such as according to solve time, for that dataset. According to embodiments, the selected threshold value is suitable even after minor changes are made in data set, meaning threshold value 706 will not need to be changed when only minor changes are made to the dataset.

Figure 7:
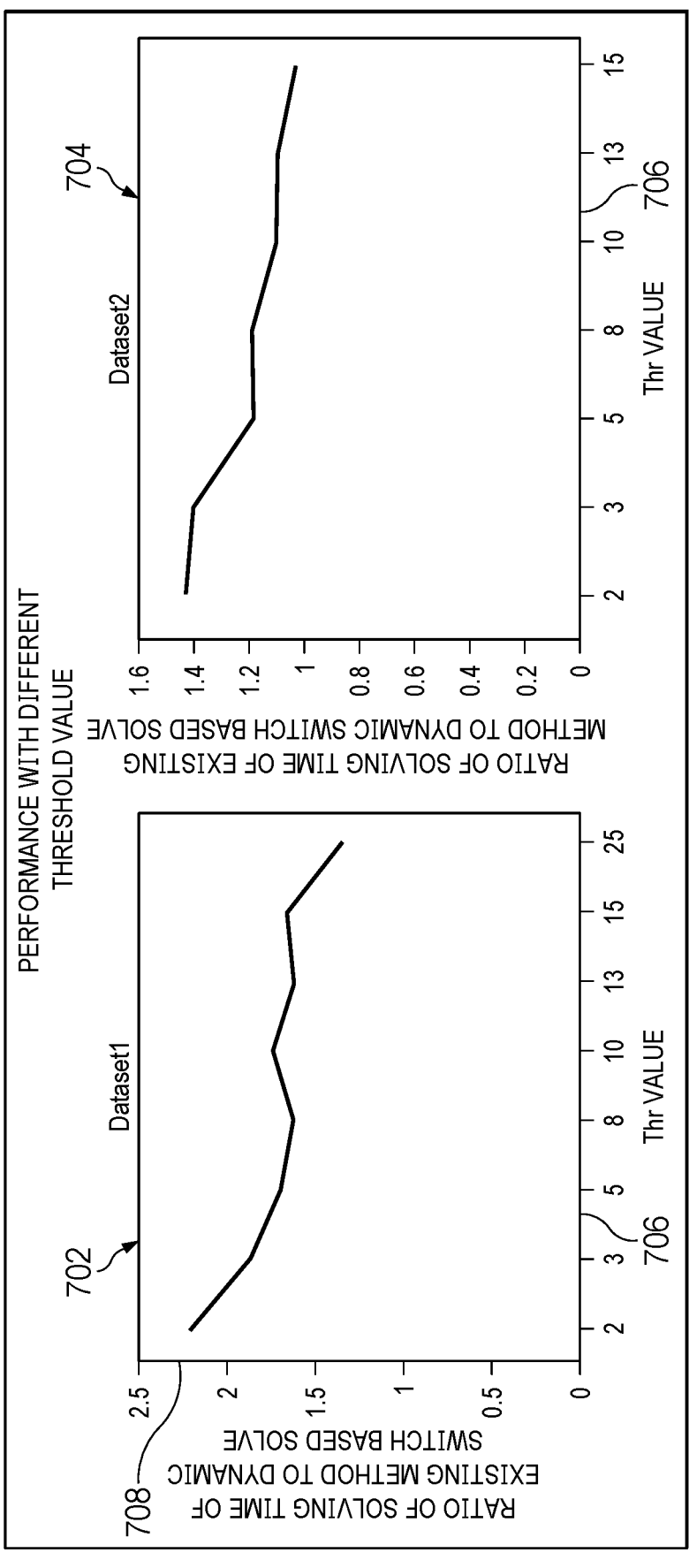
FIG. 7 illustrates a chart of a first dataset and a second dataset of an effect of a threshold value on LPOPT problem solving performance, according to an embodiment.

FIG. 7 illustrates chart 700 of first dataset 702 and second dataset 704 of an effect of threshold value 706 on LPOPT problem solving performance 708, according to an embodiment. In an embodiment, supply chain planner 110 may select one or more threshold definitions and values, stored in similarity threshold data 216, to determine where to set threshold cutoffs between similar and non-similar hierarchical problems. The threshold cutoff selection from a list of threshold values is determined by the average LP solving time to get the plan of a hierarchical problem. In embodiments, a user may select the threshold cutoff value that leads to maximum reduction is solving time. In FIG. 7, two datasets 702 and 704, each corresponds to a hierarchical LP and indicate a graph ratio of solving of the existing hierarchical method to the one with the new switching method. For example, a user may select the one with maximum y-axis value. According to embodiments, for a given set of hierarchical problems, threshold value 706 indicating that hierarchical problems are similar unless their objective functions and supply chain constraints are very different may yield increased performance 708; in another embodiment with a different set of hierarchical problems, threshold value 706 indicating that hierarchical problems are dissimilar unless they have nearly identical objective functions and supply chain constraints may yield increased performance 708. Although FIG. 7 illustrates effects of threshold values 706 in a particular configuration, embodiments contemplate supply chain planner 110 using any type of threshold values 706 stored in similarity threshold data 216, according to particular needs.

FIG. 8 illustrates an exemplary similarity threshold decision table 800, according to an embodiment. Supply chain planner 110 may store one or more similarity threshold decision tables 800 in similarity threshold data 216, and similarity comparison engine 208 may access and use one or more similarity threshold decision tables 800 to determine, at third activity 360 of method 300, whether hierarchical problems are similar to other hierarchical problems. As illustrated by FIG. 8, similarity threshold decision table 800 may permit more than two degrees of similarity (for example, "Very Similar" 802a, "Similar," 802b and "Dissimilar" 802c). Although FIG. 8 illustrates similarity threshold decision table 800 in a particular configuration, embodiments contemplate supply chain planner 110 using similarity threshold decision tables 800 of any configuration and defining any number of degrees of similarity, partial similarity, or dissimilarity, according to particular needs.

Threshold decision table 800, provides the definition of similarity at a more granular level. For example, compare with FIG. 6; two LPs are mainly differed by 1) Objective function 2) Bound section. FIG. 8 uses threshold decision table 800 to categorize the similarity at three levels: 1—dissimilar, 2—similar, and 3—very similar. In FIG. 6 problem M3 and M4 are similar according to their bounds as there are minimal changes in the number of variables fixed. Consider also the number of nonzero elements in the objective function vectors. Threshold decision table 8 helps in categorizing similarity into similar or very similar.

FIG. 9 illustrates an exemplary output decision table 900, according to an embodiment. In the embodiment illustrated by FIG. 9, supply chain planner 110 uses method 300 to solve nine separate hierarchical problems, beginning with problem condition 1 and continuing to problem condition 9, and determines whether to dynamically, utilizing advance basis information or excluding advance basis information, according to three criteria ("Bound" 902a, "Obj Coef" 902b, and "Output" 902c) and three degrees of similarity ("Dissimilar" 802c, "Similar" 802b, and "Very Similar" 802a). Although FIG. 9 illustrates output decision table 900 in a particular configuration, embodiments contemplate supply chain planner 110 executing the activities of method 300 described above to solve hierarchical problems of any configuration and with any degree of similarity or dissimilarity, according to particular needs. In an embodiment, supply chain planner may determine to solve one or more hierarchical problems in either a dual solve mode or a primal solve mode. For example, as illustrated in output decision table 900, if the bounds 902A of two hierarchical problems are similar, the Obj Coef 902B of two hierarchical problems is Very Similar, and the output 902C of two hierarchical problems is similar, shown in the chart as condition 3, then supply chain planner 110 may solve the second hierarchical problem in dual mode rather than primal mode. As shown, condition 6 may also result in the use of dual solve mode.

Decision table 900 consists of 9 different conditions and respective decisions. The current problem and the previous problem are compared and decide using the given 9 decisions whether the current flags of advanced indicator (ADV) and solving method (Primal or Dual) should switch or not. For example, assume the current flag is set to "primal" and decision table 900 is invoked before solving the current LP problem. If decision table 900 finds the comparison between current LP and the previous LP are meeting either condition 3 or condition 6, "primal" will be now switched to "dual". Similarly, supply chain planner 110 checks for an advanced indicator that points to whether the solution information of the previous LP problem should be used.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

The invention claimed is:

1. A system for reducing computational runtime in solving a supply chain problem, comprising:
   - a supply chain system comprising one or more supply chain entities; and
   - a supply chain planner comprising a server, the server comprising a user action processor, a visualization engine, a dynamic solver engine and a similarity comparison engine, wherein the server, based on input to the user action processor, is configured to:
     - solve, using the dynamic solver engine, a first hierarchical problem;
     - solve, using the dynamic solver engine, a second hierarchical problem with advance basis information from the first hierarchical problem;
     - compare, using the similarity comparison engine, the first hierarchical problem to the second hierarchical problem;
     - when the first hierarchical problem is similar to the second hierarchical problem based on a similarity threshold, re-solve, using the dynamic solver engine, the second hierarchical problem with advance basis information from the first hierarchical problem to decrease the computational runtime required to solve the second hierarchical problem; and
     - control manufacturing equipment to produce products based on a solution to the second hierarchical problem.

2. The system of claim 1, wherein the server, based on input to the user action processor, is further configured to:
   - solve, using the dynamic solver engine, a third hierarchical problem with advance basis information from the second hierarchical problem;
   - compare, using the similarity comparison engine, the second hierarchical problem to the third hierarchical problem; and
   - when the second hierarchical problem is similar to the third hierarchical problem, re-solve, using the dynamic solver engine, the third hierarchical problem with advance basis information from the second hierarchical problem.

3. The system of claim 1, wherein the server uses a similarity threshold decision table to determine a threshold of similarity for the first hierarchical problem, the second hierarchical problem and the third hierarchical problem.

4. The system of claim 3, wherein the server solves, using the dynamic solver engine, the first, second and third hierarchical problems in either a dual solve mode or a primal solve mode based on the similarity thresholds for the first, second and third hierarchical problems.

5. The system of claim 4, wherein the server, based on input to the user action processor, displays, using the visualization engine, an output decision table displaying conditions and associated decisions for solving the first, second and third hierarchical problems according to determined similarities for the first, second and third hierarchical problems.

6. The system of claim 1, wherein the first, second and third hierarchical problems comprise multi-objective problems and wherein the server performs, using the dynamic solver, variable fixing associated with the first hierarchical problem.

7. The system of claim 1, wherein the similarities between the first, second and third hierarchical problems are based upon comparisons of objective function coefficient vectors associated with the first, second and third hierarchical problems.

8. A computer-implemented method for reducing computational runtime in solving a supply chain problem, comprising:
   - solving, based on input to a user action processor, a first hierarchical problem, wherein the server comprises a user action processor, a visualization engine, the dynamic solver engine and a similarity comparison engine;
   - solving, using the dynamic solver engine of the server, a second hierarchical problem with advance basis information from the first hierarchical problem;
   - comparing, using the similarity comparison engine of a server, the first hierarchical problem to the second hierarchical problem;
   - when the first hierarchical problem is similar to the second hierarchical problem based on a similarity threshold, re-solve, using the dynamic solver engine of the server, the second hierarchical problem with advance basis information from the first hierarchical problem to decrease the computational runtime required to solve the second hierarchical problem; and
   - controlling manufacturing equipment to produce products based on a solution to the second hierarchical problem.

9. The method of claim 8, further comprising:
   - solving, based on input to the user action processor and using the dynamic solver engine of the server, a third hierarchical problem with advance basis information from the second hierarchical problem;

comparing, using the similarity comparison engine of the server, the second hierarchical problem to the third hierarchical problem; and when the second hierarchical problem is similar to the third hierarchical problem, re-solving, using the dynamic solver engine of the server, the third hierarchical problem with advance basis information from the second hierarchical problem.

10. The method of claim 8, further comprising using, by the server, a similarity threshold decision table to determine a threshold of similarity for the first hierarchical problem, the second hierarchical problem and the third hierarchical problem.

11. The method of claim 10, further comprising solving, using the dynamic solver engine, the first, second and third hierarchical problems in either a dual solve mode or a primal solve mode based on the similarity thresholds for the first, second and third hierarchical problems.

12. The method of claim 11, further comprising displaying, based on input to the user action processor and using the visualization engine, an output decision table displaying conditions and associated decisions for solving the first, second and third hierarchical problems according to determined similarities for the first, second and third hierarchical problems.

13. The method of claim 8, wherein the first, second and third hierarchical problems comprise multi-objective problems and performing, using the dynamic solver of the server, variable fixing associated with the first hierarchical problem.

14. The method of claim 8, wherein the similarities between the first, second and third hierarchical problems are based upon comparisons of objective function coefficient vectors associated with the first, second and third hierarchical problems.

15. A non-transitory computer-readable storage medium embodied with software for reducing computational runtime in solving a supply chain problem, the software when executed:

solves, based on input to a user action processor and using a dynamic solver engine of a server, a first hierarchical problem, wherein the server comprises a user action processor, a visualization engine, the dynamic solver engine and a similarity comparison engine;

solves, using the dynamic solver engine of the server, a second hierarchical problem with advance basis information from the first hierarchical problem;

compares, using the similarity comparison engine of a server, the first hierarchical problem to the second hierarchical problem;

when the first hierarchical problem is similar to the second hierarchical problem based on a similarity threshold, re-solves, using the dynamic solver engine of the server, the second hierarchical problem with advance basis information from the first hierarchical problem to decrease the computational runtime required to solve the second hierarchical problem; and controls manufacturing equipment to produce products based on a solution to the second hierarchical problem.

16. The non-transitory computer-readable storage medium of claim 15, wherein the software when executed:

solves, based on input to the user action processor and using the dynamic solver engine of the server, a third hierarchical problem with advance basis information from the second hierarchical problem;

compares, using the similarity comparison engine of the server, the second hierarchical problem to the third hierarchical problem; and when the second hierarchical problem is similar to the third hierarchical problem, re-solves, using the dynamic solver engine of the server, the third hierarchical problem with advance basis information from the second hierarchical problem.

17. The non-transitory computer-readable storage medium of claim 15, wherein the software when executed:

uses a similarity threshold decision table to determine a threshold of similarity for the first hierarchical problem, the second hierarchical problem and the third hierarchical problem.

18. The non-transitory computer-readable storage medium of claim 17, wherein the software when executed:

solves, using the dynamic solver engine, the first, second and third hierarchical problems in either a dual solve mode or a primal solve mode based on the similarity thresholds for the first, second and third hierarchical problems.

19. The non-transitory computer-readable storage medium of claim 18, wherein the software when executed:

displays, based on input to the user action processor and using the visualization engine, an output decision table displaying conditions and associated decisions for solving the first, second and third hierarchical problems according to determined similarities for the first, second and third hierarchical problems.

20. The non-transitory computer-readable storage medium of claim 15, wherein the similarities between the first, second and third hierarchical problems are based upon comparisons of objective function coefficient vectors associated with the first, second and third hierarchical problems.

* * * * *